(12) United States Patent
Darnall et al.

(10) Patent No.: US 9,229,799 B2
(45) Date of Patent: Jan. 5, 2016

(54) INFORMATION HANDLING SYSTEM SWAPPABLE BOOT STORAGE DEVICE

(75) Inventors: James Darnall, Austin, TX (US); David M. Pereira, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 774 days.

(21) Appl. No.: 13/215,051

(22) Filed: Aug. 22, 2011

(65) Prior Publication Data

US 2013/0054944 A1 Feb. 28, 2013

(51) Int. Cl.
*G06F 9/44* (2006.01)
*G06F 11/07* (2006.01)

(52) U.S. Cl.
CPC ............ *G06F 11/0757* (2013.01); *G06F 9/441* (2013.01)

(58) Field of Classification Search
None
See application file for complete search history.

(56) References Cited

U.S. PATENT DOCUMENTS

| 5,793,607 | A  | * | 8/1998 | Karidis et al. ........... 361/679.38 |
| 7,000,142 | B2 |   | 2/2006 | McCombs |
| 7,373,492 | B2 |   | 5/2008 | Brandenberger et al. |
| 7,949,814 | B2 |   | 5/2011 | Chan |
| 2007/0070832 | A1 | * | 3/2007 | Paikattu et al. ............ 369/30.32 |
| 2008/0010446 | A1 | * | 1/2008 | Kim ................................. 713/2 |
| 2009/0013165 | A1 | * | 1/2009 | Chow et al. ...................... 713/2 |

* cited by examiner

*Primary Examiner* — Paul Yanchus, III
(74) *Attorney, Agent, or Firm* — Terrile, Cannatti, Chambers & Holland, LLP; Robert W. Holland

(57) ABSTRACT

A storage device actuator on an information handling system accepts an end user input to eject a first non-volatile storage device that stores the operating system running on the information handling system. Boot logic running on firmware of the information handling system initiates a shutdown of the operating system at the information handling system in response to an eject actuation and then permits ejection of the first non-volatile storage device. The storage device actuator detects insertion of a second non-volatile storage device into the information handling system and in response to the detection of the insertion initiates a boot by the boot logic of an operating system stored on the second non-volatile storage device.

19 Claims, 3 Drawing Sheets

INFORMATION HANDLING SYSTEM SWAPPABLE BOOT STORAGE DEVICE

BACKGROUND OF THE INVENTION

1. Field of the Invention

The present invention relates in general to the field of information handling system storage devices, and more particularly to an information handling system swappable boot storage device.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with a variety of processing components disposed in a housing. For example, a central processing unit (CPU) executes instructions stored in random access memory (RAM) to perform functions. Generally, an operating system running on the CPU coordinates the use of processing components by applications running over the operating system. For instance, the WINDOWs operating system supports execution of a multimedia application, which retrieves multimedia content from an optical disc drive and presents the multimedia content through a graphics and audio subsystem at a display and speakers. Portable information handling systems include in portable housing components sufficient to support execution of applications free from any fixed resources or peripherals. For example, portable information handling systems integrate a battery and display in the housing to power the processing components free from an external power source and to present information as visual images free from a peripheral display. The convenience of portable information handling systems has made portable systems an accepted alternative to fixed desktop systems among both enterprise and individual end users.

In order to transition from an off state to an operational state, information handling systems generally perform a boot operation. The boot initiates with firmware instructions stored in non-volatile memory of the information handling system, such as flash memory within a chipset. Boot instructions, often code within firmware that is referred to as the BIOS, power up the CPU and direct retrieval of the operating system from a non-volatile storage device, such as a hard disk drive or solid state drive, to the RAM for execution by the CPU. The non-volatile storage device also typically stores applications that run over the operating system, such as word processing or multi-media applications, and end user information, such as documents and multimedia content. Two physically identical information handling systems having exactly the same processing components can have entirely different functionality based upon the operating system, applications, device drivers and content stored on the hard disk drive of each system.

At manufacture of an information handling system, an "image" of the hard disk drive is usually copied to the hard disk drive with the operating system and applications purchased or licensed to an end user of the information handling system. Often, enterprises will purchase a number of identical information handling systems for use by employees, each information handling system having an enterprise image, which is individualized for intended end users at delivery of the systems to the enterprise. By controlling the image, enterprises control the operating system and applications initially available to the end user. If a hard disk drive fails in an information handling system, information technology administrators can repair the information handling system by removing and replacing the hard disk drive with another hard disk drive having a similar image. Generally, this repair is performed by an information technology professional since the hard disk drive is usually built into the housing with permanent attachment devices, such as screws, and the BIOS of the information handling system must typically be updated to interact with a new hard disk drive by loading appropriate drivers to the chipset.

SUMMARY OF THE INVENTION

Therefore a need has arisen for a system and method which swaps non-volatile storage devices at an information handling system in a user-friendly manner.

In accordance with the present invention, a system and method are provided which substantially reduce the disadvantages and problems associated with previous methods and systems for changing a non-volatile storage device of an information handling system. Actuation at an information handling system of a storage device actuator to eject a non-volatile storage device that stores an operating system running on the information handling system is managed by initiating a shutdown of the operating system before ejecting the non-volatile storage device. Insertion of a replacement non-volatile storage device in the information handling system automatically initiates boot of the information handling system to an operating system stored on the replacement non-volatile storage device.

More specifically, an information handling system is built in a housing that supports processing components for processing information, such as a portable housing that supports a CPU, RAM, a non-volatile storage device, firmware and a display. An operating system stored on a bootable non-volatile storage device boots with boot logic of the firmware to an operational state, which allows the operating system to coordinate operation of the processing components and applications that run on the processing components. An end user actuates a storage device actuator to eject the first storage device from the information handling system and, in response, the boot logic shuts the operating system down from the operational state. After the operating system is shut down, the storage device actuator ejects the first non-volatile storage device. An end user then inserts a second non-volatile storage device into the information handling system that stores a second operating system. The storage device actuator detects the insertion and initiates a boot of the second operating system to an operational state that then coordinates operation of the information handling system.

The present invention provides a number of important technical advantages. One example of an important technical advantage is that a user friendly non-volatile storage device swap provides an end user of an information handling system with improved flexibility in system usage and greater information security. For example, the functions supported by an information handling system change based upon the installed hard disk drive so that the same system can support work and personal usage functions without intermingling work and personal data. In the event of a hard disk drive failure, such as due to breakage or attack by a malicious virus, an end user can quickly and easily return the information handling system to an operational state by swapping into the system an operational storage device. If processing components of an information handling system fail, an end user can remove the hard disk drive from the failed information handling system and insert the hard disk drive in an operational information handling system to continue working on the new information handling system using the hard disk drive from the failed information handling system. Firmware support of storage device swaps ensures automatic transition of the information handling system from an executing operating system of a removed storage device to an operating system of a new storage device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system swaps non-volatile storage devices by automatically shutting down an operating system before removing the storage device that stores the operating system and automatically re-booting to an operating system stored on a newly inserted non-volatile storage device. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
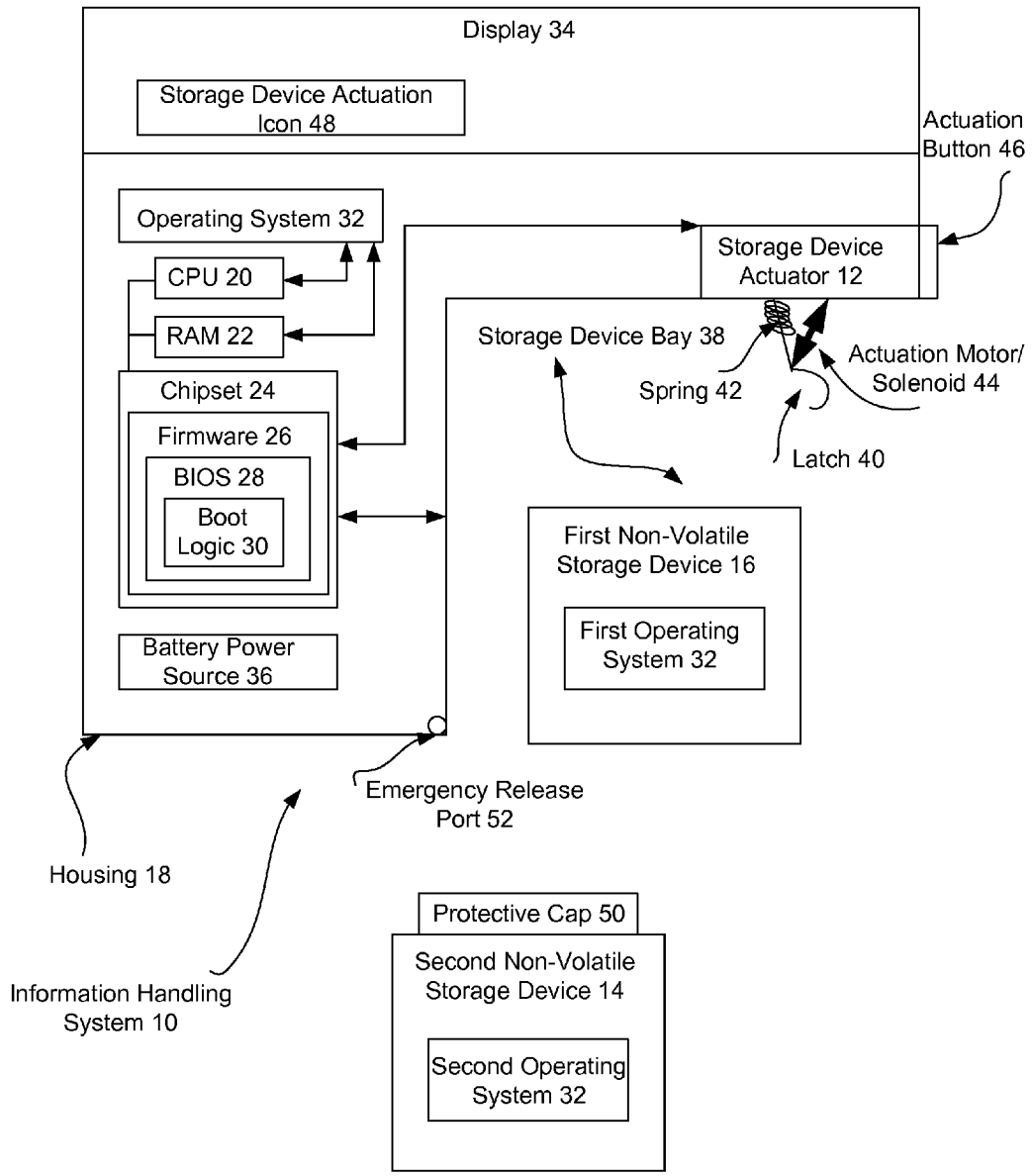
FIG. 1 depicts a block diagram of an information handling system having a storage device actuator to swap between first and second non-volatile storage devices.

Referring now to FIG. 1, a block diagram depicts an information handling system 10 having a storage device actuator 12 to swap between first and second non-volatile storage devices 14 and 16. Information handling system 10 is built from plural processing components disposed in a housing 18, such as a CPU 20, RAM 22 and a chipset 24 that supports execution of firmware 26. During normal operations, instructions of firmware 26, such as instructions of a BIOS 28, include boot logic 30 that initiates upon power up of the processing components to coordinate retrieval of an operating system 32 from an installed non-volatile storage device 14 or 16 for execution on CPU 20 and RAM 22. For example, a WINDOWS or LINUX operating system 32 is retrieved from a hard disk drive storage device 14 by boot logic 30, which loads a driver for the hard disk drive storage device 14 and then copies the operating system 32 from storage device 14 to RAM 22 for execution by CPU 20. Once a boot of the operating system 32 is complete, operating system 32 coordinates the operation of processing components to perform desired functions, such as presenting information as images on a display 34. In the depicted example embodiment, information handling system 10 is a portable system that integrates display 34 and a power source 36, such as a battery. In alternative embodiments, other types of information handling systems may be used, such as desktop or server information handling systems.

Storage device actuator 12 and boot logic 30 cooperate to support swapping at information handling system 10 of first storage device 14 and second storage device 16. Storage device actuator 12 detects an actuation by an end user that indicates a request to eject a storage device electrically coupled at a storage device bay 38 of information handling system 10, such as physical actuation of a button or an input at a storage device eject icon 40 presented at display 34. Upon detection of an ejection request, storage device actuator 12 sends a command to boot logic 30 to shutdown the operating system 32 running on CPU 20 and stored on the installed first non-volatile storage device 14. Boot logic 30 shuts down operating system 32 and transfers control of information handling system 10 to firmware 26 running on chipset 24, such as BIOS 28. Once the shutdown of operating system 32 has proceeded at least to the point where no more reads or writes are needed at first storage device 14, boot logic 30 approves ejection of first storage device 14 and storage device actuator 12 ejects first storage device 14. In one alternative embodiment, operating system 32 may continue to run on CPU 20 by using instructions stored in RAM 22 that do not need to read or write information at a storage device in order to control information handling system 10, such as by building a RAM drive to operate information handling system 10 pending installation of another storage device in storage device bay 38.

Storage device actuator 12 and boot logic 30 cooperate to accept a second storage device 16 in the place of first storage device 14, and to bring an operating system 32 stored on second storage device 16 to an operational state at CPU 20. Storage device actuator 12 detects insertion of second storage device 16 in storage device bay 38 and initiates boot logic 30 to establish communication with second storage device 16 and boot an operating system 32 stored on second storage device 16 to an operational state at CPU 20 and RAM 22.

Information handling system 10 then operates under the management of operating system 32 stored on second non-volatile storage device 16. Non-volatile storage devices 14 and 16 may both be hard disk drives or solid state drives, or may be different types of storage devices, such as a hard disk drive and a solid state drive. In one embodiment, first non-volatile storage device 14 stores an enterprise image to perform work functions and second non-volatile storage device 16 stores an entertainment image to present multimedia information, such as movies, so that information handling system 10 converts from a work system to a personal system by swapping hard disk drives. Each image is prepared as part of the manufacture of information handling system 10, which is manufactured and delivered with two non-volatile storage devices. In one embodiment, a non-volatile storage device can insert into a second information handling system, such as a desktop information handling system, without booting the second information handling system to provide convenient data transfer from the first information handling system, such as backup of a portable system at a desktop system.

Storage device actuator 12 includes a latch 40 that secures a non-volatile storage device 14 or 16 in bay 38, a biasing device 42, such as a spring, that provides a biasing force to eject non-volatile storage device 14 or 16 from bay 38, and an actuation device, such as a solenoid or motor, that selectively releases or secures latch 40. An end user indicates a desire to eject a non-volatile storage device 14 from bay 38 by pressing an actuation button 46 or activating an icon 48. Logic associated with storage device actuator 12, such as firmware 26 in chipset 24, detects the actuation and initiates a shutdown of the operating system 32 running on information handling system 10 and stored on non-volatile storage device 14. Once the operating system 32 is shutdown so that ejection of non-volatile storage device 14 will not disrupt operations at information handling system 10, boot logic 30 allows storage device actuator 12 to eject non-volatile storage device 12. For example, actuator device 44 moves latch 40 so that spring 42 is released to push with a biasing force on non-volatile storage device 14 to push non-volatile storage device 14 free from its electrical coupling and at least part of the way out of bay 38.

Storage device actuator 12 coordinates insertion of a new non-volatile storage device 16 that an end user inserts into bay 38 with a push to electrically couple storage device 16 to the connector in bay 38. An end user's push overcomes the biasing force of spring 42 to engage latch 40, which holds non-volatile storage device 16 in place and provides an indication to boot logic 30 that non-volatile storage device 16 is available to provide an operating system 32 to boot to information handling system 10. A protective shield around each non-volatile storage device 14 and 16 protects against electrostatic discharge during the ejection and insertion processes. A protective cap 50 covers the connector of each non-volatile storage device 14 or 16 when not installed in a bay 38. In one embodiment, an emergency release port 52 provides access to latch 40 to release an installed storage device from bay 38 in the event of a system failure.

Figure 2:
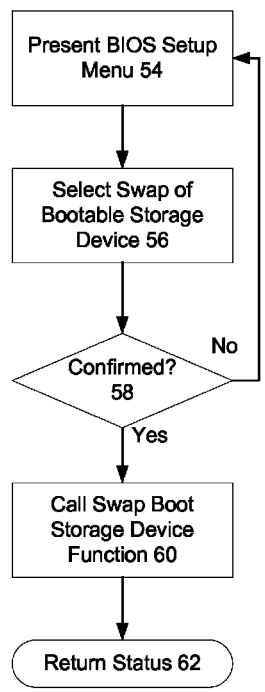
FIG. 2 depicts a flow diagram of a process at a BIOS setup menu to swap an installed non-volatile storage device with a replacement non-volatile storage device.

Referring now to FIG. 2, a flow diagram depicts a process at a BIOS setup menu to swap an installed non-volatile storage device with a replacement non-volatile storage device. At step 54, a BIOS menu is presented which includes an option to initiate a non-volatile storage device swap. Selection of the "swap boot drive" option will initiate a process in which the BIOS ejects a mounted storage device that stores the operating system currently running on the information handling system and allows an insertion of a replacement storage device that provides an operating system to boot at the information handling system. At step 56, an end user selects through the display a swap of the storage device. At step 58, a confirmation of the swap is requested from the end user. If the end user fails to confirm the storage device swap, the process returns to step 54. If the end user confirms storage device ejection, the process continues to step 60 to call a "swap_boot_storage_device" function that ejects the installed storage device. At step 62, the ejection status is returned for presentation at the BIOS menu.

Figure 3:
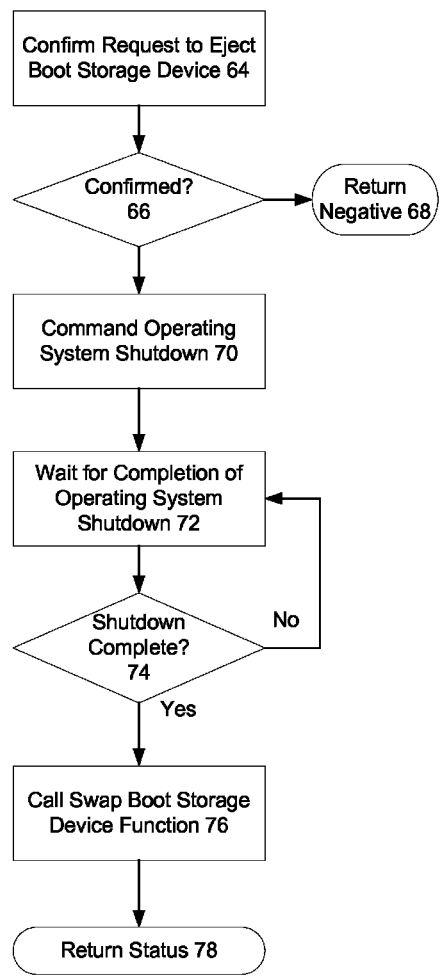
FIG. 3 depicts a flow diagram of a process for calling a boot storage device ejection with a storage device actuator.

Referring now to FIG. 3, a flow diagram depicts a process for calling a boot storage device ejection with a storage device actuator. While an operating system stored at a boot storage device installed in an information handling system is running to manage the information handling system, an ejection request is received at step 64 for confirmation by an end user, such as in response to actuation of an ejection button, ejection icon or ejection hot key. At step 66 an end user confirms the ejection to continue to step 70 or fails to confirm the storage device ejection to end the process at step 68. At step 70, with confirmation of the storage device ejection request, a command issues to shutdown the operating system at the information handling system. At step 72, the BIOS monitors the status of the operating system to determine if a shutdown has completed. At step 74, if the shutdown is not complete, the process returns to step 72 to continue monitoring shutdown of the operating system. If at step 74 the operating system shutdown is complete, the process continues to step 76 to call the "swap_boot_storage_device" function that ejects the storage device. At step 78, the ejection status is returned for presentation at the information handling system.

Figure 4:
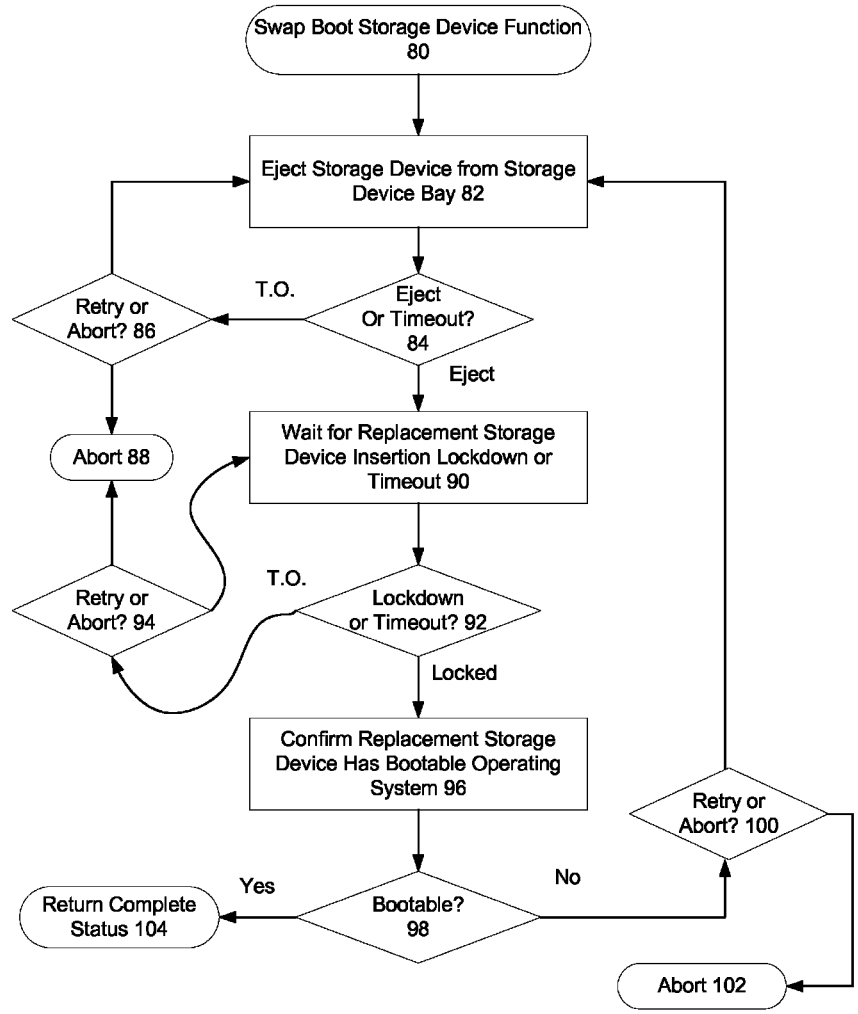
FIG. 4 depicts a flow diagram of ejecting and replacing a bootable storage device at an information handling system.

Referring now to FIG. 4, a flow diagram depicts ejecting and replacing a bootable storage device at an information handling system. The process begins at step 80 with a call of the swap_boot_storage_device function. At step 82, the storage device actuator responds by ejecting the storage device from the storage device bay. At step 84, a determination is made of whether the ejection was successful after a timeout period has passed. If the ejection was not successful, the process continues to step 86 to determine whether to attempt another ejection or abort the process. If another attempt is selected, the process returns to step 82; if an abort is selected, the process ends at step 88 by presenting the abort to the end user. If a successful ejection occurs at step 84, the process continues to step 90 to await insertion of a replacement bootable storage device having an operating system that can be booted to the information handling system. At step 92, a determination is made of whether a replacement storage device is locked into the storage bay connector or a timeout has occurred. If a timeout has occurred, the process continues to step 94 to determine whether to retry an insertion of a replacement storage device or to abort. If another attempt to insert a replacement storage device is selected, the process returns to step 90; if an abort is selected, the process returns to step 88 to abort. If a replacement storage device is detected at step 92 as locked into the storage bay connector, the process continues to step 96 to determine if the inserted replacement storage device is bootable. If not, the process continues to step 100 to determine whether to retry for a bootable device at step 82 or to abort at step 102. If at step 98 the inserted replacement storage device is bootable, the process continues to step 104 to return the bootable status and initiate a boot to the operating system stored on the inserted replacement storage device.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having a storage device bay, the storage device bay having a storage device connector;
   a processor disposed in the housing and operable to process information;
   random access memory interfaced with processor and operable to store the information;
   firmware interfaced with the processor, the firmware having boot instructions for booting an operating system into an operational state on the processor and random access memory;
   a first storage device disposed in the storage device bay and interfaced with the firmware through the storage device connector, the first storage device storing a first operating system in non-volatile memory, the first operating system in an operational state on the processor and random access memory; and
   a storage device actuator accessible at the housing and operable to receive an end user input to eject the first storage device from the storage device bay, the storage device actuator further operable to, in response to the end user input to eject the first storage device, and actuate the first storage device to extend from the storage device bay;
   wherein the first operating system remains active in the random access memory configured as a RAM drive after removal of the first storage device to provide control pending installation of a second storage device.

2. The information handling system of claim 1 further comprising:
   a second storage device storing a second operating system in non-volatile memory;
   wherein the storage device actuator is further operable to detect insertion of the second storage into the storage device bay to interface with the storage device connector and, in response to the detecting, to initiate boot of the second operating system to an operational state on the processor and random access memory.

3. The information handling system of claim 2 wherein the first and second storage devices comprise hard disk drives.

4. The information handling system of claim 2 wherein the first and second storage devices comprise solid state drives.

5. The information handling system of claim 2 wherein the first storage device comprises a hard disk drive and the second storage device comprises a solid state drive.

6. The information handling system of claim 2 wherein the housing comprises a portable housing having an integrated power source and display.

7. The information handling system of claim 2 wherein the storage device actuator comprises a solenoid and spring, the solenoid actuating in response to an end user input to release the spring from a compressed position so that the spring pushes the first storage device outward from an installed position within the storage device bay.

8. The information handling system of claim 2 wherein the first storage device comprises an enterprise storage device having enterprise applications and the second storage device comprises a personal storage device having entertainment multimedia information.

9. The information handling system of claim 2 wherein the storage device actuator comprises an icon presented at a display integrated in the housing.

10. A method for operating an information handling system with plural non-volatile storage devices, each non-volatile storage device having an operating system, the method comprising:
    booting the information handling system to a first operational state by executing a first operating system at a processor of the information handling system, the first operating system retrieved from storage on a first non-volatile storage device coupled to a connector accessible at a housing of the information handling system;
    actuating a storage device actuator at the information handling system;
    in response to the actuating, removing the first operational state at the information handling system by shutting down the first operating system at the processor;
    maintaining boot logic of the information handling system as instructions stored in firmware prepared to accept a second operating system for boot from a second non-volatile storage device; and
    in response to the removing, automatically actuating the first non-volatile storage device to decouple the first non-volatile storage device from the connector.

11. The method of claim 10 further comprising:
    detecting insertion of a second non-volatile device into the connector; and
    automatically in response to the detecting booting the information handling system to a second operational state by executing a second operating system at the processor, the second operating system retrieved from storage on the second non-volatile storage device.

12. The method of claim 11 wherein automatically actuating the first non-volatile storage device further comprises releasing a latch with an electric motor to provide a biasing force at the first non-volatile storage device that pushes the first non-volatile storage device from the connector.

13. The method of claim 12 wherein detecting insertion of a second non-volatile device into the connector further comprises compressing the biasing device by pushing the second non-volatile storage device into the connector until the latch closes.

14. The method of claim 11 further comprising:
    inserting the first non-volatile storage device into a second information handling system; and
    in response to the inserting, automatically booting the first operating system at the second information handling system.

15. The method of claim 11 further comprising:
    inserting the first non-volatile storage device into a second information handling system; and
    reading information from the first non-volatile storage device with an operating system already running on the second information handling system.

16. The method of claim 11 wherein at least one of the first and second non-volatile storage devices comprise a hard disk drive.

17. The method of claim 11 wherein at least one of the first and second non-volatile storage devices comprises a solid state drive.

18. A system for operating an information handling system with plural non-volatile storage devices, each non-volatile storage device having an operating system, the system comprising:
    a storage device actuator operable to eject a non-volatile storage device from an information handling system in response to an actuation by an end user; and
    boot logic stored in firmware of the information handling system and operable to shutdown an operating system running on the information handling system in response to the actuation of the storage device actuator, the operating system stored on the non-volatile storage device, the boot logic delaying ejection of the non-volatile storage device at least until shutdown of the operating system has completed accesses to the non-volatile storage device, the boot logic remaining active to automatically initiate boot to a second operating system on a second non-volatile storage device upon detection of the second non-volatile storage device insertion.

19. The system of claim 18 wherein the storage device actuator is further operable to detect insertion of a non-volatile storage device into the information handling system and initiate a boot by the boot logic of an operating system stored on the non-volatile storage device.

* * * * *